United States Patent
Liu et al.

(10) Patent No.: US 11,397,272 B2
(45) Date of Patent: Jul. 26, 2022

(54) DATA AUGMENTATION FOR SEISMIC INTERPRETATION SYSTEMS AND METHODS

(71) Applicant: ExxonMobil Upstream Research Company, Spring, TX (US)

(72) Inventors: Wei D. Liu, Schenectady, NY (US); Huseyin Denli, Basking Ridge, NJ (US); Kuang-Hung Liu, Basking Ridge, NJ (US); Cody J. Macdonald, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 390 days.

(21) Appl. No.: 16/685,657

(22) Filed: Nov. 15, 2019

(65) Prior Publication Data
US 2020/0183035 A1   Jun. 11, 2020

Related U.S. Application Data

(60) Provisional application No. 62/826,095, filed on Mar. 29, 2019, provisional application No. 62/777,941, filed on Dec. 11, 2018.

(51) Int. Cl.
*G01V 1/32* (2006.01)
*G06N 20/00* (2019.01)
(Continued)

(52) U.S. Cl.
CPC .............. *G01V 1/32* (2013.01); *G01V 1/306* (2013.01); *G01V 1/345* (2013.01); *G01V 1/364* (2013.01); *G06N 20/00* (2019.01)

(58) Field of Classification Search
CPC .......... G01V 1/32; G01V 1/306; G01V 1/345; G01V 1/364; G01V 2210/64; G01V 1/303; G01V 99/005; G01V 1/28; G06N 20/00
See application file for complete search history.

(56) References Cited

U.S. PATENT DOCUMENTS

| | | | |
|---|---|---|---|
| 5,444,619 A | 8/1995 | Hoskins et al. | |
| 5,940,777 A | 8/1999 | Keskes | |

(Continued)

FOREIGN PATENT DOCUMENTS

| | | | | |
|---|---|---|---|---|
| CA | 3122684 A1 | * | 6/2020 | ............... G01V 1/28 |
| CA | 3122985 A1 | * | 6/2020 | ............. G01V 1/282 |

(Continued)

OTHER PUBLICATIONS

Akcelik et al. (2011) "Multiparameter Material Model and Source Signature Full Waveform Inversion," *SEG San Antonio 2011 Annual Meeting*, pp. 2406-2410.

(Continued)

*Primary Examiner* — Daniel Pihulic
(74) *Attorney, Agent, or Firm* — ExxonMobil Upstream Research Company—Law Department

(57) ABSTRACT

A method and apparatus for machine learning for use with automated seismic interpretation include: obtaining input data; extracting patches from a pre-extraction dataset based on the input data; transforming data of a pre-transformation dataset based on the input data and geologic domain knowledge and/or geophysical domain knowledge; and generating augmented data from the extracted patches and the transformed data. A method and apparatus for machine learning for use with automated seismic interpretation include: a data input module configured to obtain input data; a patch extraction module configured to extract patches from a pre-extraction dataset that is based on the input data; a data transformation module configured to transform data from a pre-transformation dataset that is based on the input data and geologic domain knowledge and/or geophysical domain knowledge; and a data augmentation module configured to augment data from the extracted patches and the transformed data.

27 Claims, 7 Drawing Sheets

(51) Int. Cl.
*G01V 1/30* (2006.01)
*G01V 1/34* (2006.01)
*G01V 1/36* (2006.01)

(56) References Cited

U.S. PATENT DOCUMENTS

| | | | |
|---|---|---|---|
| 6,374,185 B1 | 4/2002 | Taner et al. | |
| 6,438,493 B1 | 8/2002 | West et al. | |
| 6,662,112 B2 | 12/2003 | Eastwood et al. | |
| 6,735,526 B1 | 5/2004 | Meldahl et al. | |
| 7,415,401 B2* | 8/2008 | Calvert | G01V 1/282 702/14 |
| 7,844,402 B2 | 11/2010 | Klein et al. | |
| 8,055,026 B2 | 11/2011 | Pedersen | |
| 8,213,261 B2* | 7/2012 | Imhof | G01V 1/32 702/14 |
| 9,366,772 B2 | 6/2016 | Imhof | |
| 9,489,769 B2 | 11/2016 | Luneburg et al. | |
| 9,618,839 B2 | 4/2017 | Witte et al. | |
| 10,996,372 B2* | 5/2021 | Denli | G06N 3/08 |
| 11,079,509 B1* | 8/2021 | Tertois | G01V 1/325 |
| 2015/0234070 A1 | 8/2015 | Xu et al. | |
| 2017/0364795 A1 | 12/2017 | Anderson et al. | |
| 2018/0106917 A1 | 4/2018 | Osypov et al. | |
| 2018/0120461 A1 | 5/2018 | Allegar et al. | |
| 2018/0306940 A1 | 10/2018 | Basler-Reeder et al. | |
| 2019/0064378 A1* | 2/2019 | Liu | G06N 3/08 |
| 2019/0162868 A1 | 5/2019 | Salman et al. | |
| 2019/0169962 A1 | 6/2019 | Aqrawi et al. | |
| 2019/0250294 A1 | 8/2019 | Salman | |
| 2019/0383985 A1 | 12/2019 | Salman et al. | |
| 2019/0391295 A1 | 12/2019 | Salman et al. | |
| 2020/0183032 A1* | 6/2020 | Liu | G01V 1/301 |
| 2020/0183035 A1* | 6/2020 | Liu | G01V 1/303 |
| 2020/0184374 A1* | 6/2020 | Liu | G06N 20/00 |
| 2021/0158104 A1* | 5/2021 | Wu | G06K 9/6271 |

FOREIGN PATENT DOCUMENTS

| | | | | |
|---|---|---|---|---|
| CN | 109765615 A * | 5/2019 | | G01V 1/282 |
| EP | 0 561 492 B1 | 1/1998 | | |
| WO | WO 2017/188858 A1 | 11/2017 | | |
| WO | WO-2018026995 A1 * | 2/2018 | | G01V 1/28 |
| WO | WO-2020123097 A1 * | 6/2020 | | G01V 1/282 |
| WO | WO-2020123098 A1 * | 6/2020 | | G01V 1/28 |
| WO | WO-2020123100 A3 * | 7/2020 | | G01V 1/282 |
| WO | WO-2021165660 A1 * | 8/2021 | | G01V 1/301 |

OTHER PUBLICATIONS

Andersson et al. (2004) "T-H-M-C Modelling of Rock Mass Behaviour—1:The Purposes, The Procedures and the Products", *Geo-Engineering*, pp. 433-438.
Araya-Polo et al. (2017) "Automated fault detection without seismic processing," *The Leading Edge*, vol. 36, pp. 208-214.
Arjovsky et al. (2017) "Wasserstein GAN", pp. 1-32.
Aster et al. (2013) "Tikhonov Regularization", *Parameter Estimation and Inverse Problems*, pp. 93-127.
Baan et al. (2000) "Neural networks in geophysical applications", *Geophysics*, vol. 65, No. 4, pp. 1032-1047.
Backus et al. (1967) "Numerical applications of a formalism for geophysical inverse problems", *Geophysical Journal of the Royal Astronomical Society*, vol. 13, pp. 247-276.
Bellemare et al. (2017) "The Cramer Distance as a Solution to Biased Wasserstein Gradients", pp. 1-20.
Chan et al. (2017) "Parametrization and the Generation of Geological Models with Generative Adversarial Networks", pp. 1-28.
Chave et al. (2012) "Introduction to the magnetotelluric method", *The magnetoelluric method: theory and practice*, Cambridge University Press, pp. 1-18.
Chen et al. (2016) "InfoGAN: Interpretable Representation Learning by Information Maximizing Generative Adversarial Nets", *30th Conference on Neural Information Processing Systems*, pp. 1-9.
Cubuk et al. (2018) "AutoAugment: Learning Augmentation Policies from Data", pp. 1-14..
Denili et al. (2013) "Full-Wavefield Inversion for Acoustic Wave Velocity and Attenuation," *SEG Houston 2013 Annual Meeting*, pp. 980-985.
Duchi et al. (2011) "Adaptive subgradient methods for online learning and stochastic optimization", *Journal of Machine Learning Research*, vol. 12, pp. 2121-2159.
Etgen et al. (2009) "An overview of depth imaging in exploration geophysics", *Geophysics*, Vo.74, pp. WCA5-WCA17.
Etgen et al. (2010) "Introduction to this special section: Reverse time migration" *The Leading Edge*, vol. 29, p. 1363.
Fedus et al. (2018) "Many Paths to Equilibrium: GANs Do Not Need to Decrease a Divergence at Every Step", *International Conference on Learning Representation*, pp. 1-21.
Gibson et al. (2003) "Automatic Fault Detection for 3D Seismic Data," *DICTA* pp. 821-830.
Goodfellow et al. (2014) "Generative Adversarial Nets," *Advances in Neural Information Processing Systems 27*, NIPS, pp. 1-9.
Guillen et al. (2015) "Supervised learning to detect salt body", *SEG New Orleans 2015 Annual Meeting*, pp. 1826-1829.
Guirajani et al. (2017) "Improved Training of Wasserstein GANs", *CoRR*, pp. 1-11.
Dave Hale (2013) "Methods to compute fault images, extract fault surfaces, and estimate fault throws from 3D seismic images", *Geophysics*, vol. 78, pp. O33-O43.
Hami-Eddine et al. (2012) "Anomaly Detection using dynamic Neural Networks, classification of prestack data", *SEG Las Vegas 2012 Annual Meeting*, pp. 1-5.
Hamj-Eddine et al. (2015) "A new technique for lithology and fluid content prediction from prestack data: An application to a carbonate reservoir", Interpretation, vol. 3, No. 1, pp. S19-S32.
He et al. (2016) "Deep Residual Learning for Image Recognition," *2016 IEEE Conference on Computer Vision and Pattern Recognition (CVPR)*, pp. 770-778.
Hesthaven et al. (2007), "Nodal Discontinuous Galerkin Methods: Algorithms, Analysis, and Applications", *Springer, Texts in Applied Mathematics*, pp. 19-41.
Huang et al. (2017) "A scalable deep learning platform for identifying geologic features from seismic attributes", *The Leading Edge*, vol. 36, pp. 249-256.
Isola et al. (2018) "Image-to-Image Translation with Conditional Adversarial Networks", *2017 IEEE Conference on Computer Vision and Pattern Recognition*, pp. 5967-5976.
Janoos et al. (2014) "Multi-scale graphical models for spatio-temporal processes", *Advances in Neural Information Processing Systems*, vol. 27, pp. 316-324.
Jiang et al. (2016) "Detecting prospective structures in volumetric geo-seismic data using deep convolutional neural networks," Poster presented at the annual foundation council meeting of the Bonn-Aachen International Center for Information Technology (b-it), p. 1.
Ying Jiang (2017) *"Detecting Geological Structures in Seismic vols. Using Deep Convolutional Neural Networks"*, *Master Thesis from Rheinish-Westfalische Technische Hochschule Aachen*, p. 1-76.
Kingma et al. (2015) *"Adam: A Method for Stochastic Optimization,"* *ICLR-Conference Paper*, pp. 1-15.
Koenderink et al. (1994) "Two-plus-one-Dimensional differential geometry," *Pattern Recognition Letters*, vol. 15, pp. 439-443.
Komatitsch et al. (2000) "The spectral element method for three-dimensional seismic wave propagation" *SEG Technical Program Expanded Abstracts*, pp. 2197-2200.
Krizhevsky et al. (2012) "ImageNet classification with deep convolution neural networks", *NIPS*, pp. 1-9.
LeCun, Y. (2015) "Deep Learning," *Nature*, vol. 521, pp. 436-444.
Lewis et al. (2017) "Deep learning prior models from seismic images for fullwaveform inversion", *SEG Technical Program Expanded Abstracts*, pp. 1512-1517.
Leveque, R. J. (2002) "Finite volume methods for hyperbolic problems", Cambridge Texts in Applied Mathematics, Cambridge University Press, pp. 64-85.
Li et al. (2015) "Gravity and magnetic methods in mineral and oil & gas exploration and production", *EAGE*, pp. 15-24.

(56) References Cited

OTHER PUBLICATIONS

Lin et al. (2013) "A wavelet-based model compression method for three-dimensional electromagnetic data inversion", *SEG Houston 2013 Annual Meeting*, pp. 707-712.
Lin et al. (2017) "Building Subsurface Velocity Models with Sharp Interfaces Using Interface-Guided Seismic Full-Waveform Inversion", *Proceedings: Thirty-Ninth Workshop on Geothermal Reservoir Engineering*, pp. 1-8.
Lines et al. (2004) "Fundamentals of Geophysical Interpretation", Chapter 15, Geophysical Monograph Series, Society of Exploration Geophysicists, pp. 137-144.
Lines et al. (2004) "Fundamentals of Geophysical Interpretation", Chapter 16, Geophysical Monograph Series, Society of Exploration Geophysicists, pp. 145-158.
Lines et al. (2004) "Fundamentals of Geophysical Interpretation", Chapter 17, Geophysical Monograph Series, Society of Exploration Geophysicists, pp. 159-170.
Lines et al. (2004) "Fundamentals of Geophysical Interpretation", Chapter 18, Geophysical Monograph Series, Society of Exploration Geophysicists, pp. 171-180.
Long et al. (2015) "Fully Convolutional Networks for Semantic Segmentation," *Proceedings of the IEEE Computer Society Conference on Computer Vision and Pattern Recognition*, pp. 3431-3440.
Ma et al. (2012) "Image-guided sparse-model full waveform inversion", *Geophysics*, vol. 77, pp. R189-R198.
Macias et al. (2000) "Artificial neural networks for parameter estimation in geophysics", *Geophysical Prospecting*, vol. 48, pp. 21-47.
Marroquin et al. (2009) "A visual data-mining methodology for seismic facies analysis: Part 1—testing and comparison with other unsupervised clustering methods", *Geophysics*, vol. 74, pp. P1-P11.
Miller et al. (2001) "Seismic interpretation and processing applications", *Handbook of Geophysical Exploration*, pp. 101-118.
Moczo et al. (2007) "The finite-difference time-domain method for modeling of seismic wave propagation", *Advances in Geophysics*, vol. 48, pp. 421-516.
Mun et al. (2017) "Comparison of objective functions in CNN-based prostate magnetic resonance image segmentation", *2017 IEEE International Conference on Image Processing (ICIIP)*, pp. 3859-3863.
Nocedal et al. (2006) "Numerical optimization", *Springer Series in Operations Research and Financial Engineering*, pp. 10-29.
D. Oidenburg (1990) "Inversion of electromagnetic data: An overview of new techniques", *Surveys in Geophysics*, vol. 11 pp. 231-270.
PaleoScan Software available from Eliis, http://www.eliis.fr/products/paleoscan-sofware, downloaded Jul. 3, 2018, p. 1-2.
G. Partyka, (2017) "Seismic processing and analysis in service of interpretation", *SEG Technical Program Expanded Abstracts*, pp. 5261-5266.
Regone et al. (2017) "Geologic model building in SEAM Phase II—Land seismic challenges", The Leading Edge, pp. 738-749.
Ronneberqer et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.
Roth et al. (1994) "Neural networks and inversion of seismic data", *Journal of Geophysical Research*, vol. 99, pp. 6753-6768.
Sava et al. (2009) "Overview and classification of wavefield seismic imaging methods" *The Leading Edge*, vol. 28, pp. 170-183.
Schaefer et al. (2006) "Image deformation using moving least squares", *ACM Transactions on Graphics* vol. 25, pp. 533-540.
Schiesser (1991) "A PDE Second-Order in Time: The Hyperbolic Wave Equation", *The Numerical Method of Lines: Integration of Partial Differential Equations*, pp. 70-75.
Schiesser (1991) "Spatial Differentiation", *The Numerical Method of Lines: Integration of Partial Differential Equations*, pp. 97-122.
Simonyan, K. (2015) "Very Deep Convolutional Networks for Large-Scale Image Recognition," *ICLR 2015 Conference Paper*, pp. 1-15.
T. Smith (2017) "Geobody interpretation through multiattribute surveys, natural clusters and machine learning", *SEG International Exposition and 87th Annual Meeting*, pp. 2153-2157.
Srivastava et al. (2014) "Dropout: A simple way to prevent neural networks from overfitting", *Journal of Machine Learning Research*, vol. 15, pp. 1929-1958.
Tarantola (2005) "Inverse problem theory and methods for model parameter estimation: Chapter 3 The Least-Squares Criterion", *SIAM* pp. 57-64.
Tschannen et al. (2017) "Facies classification from well logs using an inception convolutional network" XP080767099.
Virieux et al. (2009) "An overview of full-waveform inversion in exploration geophysics", *Geophysics*, vol. 74, pp. WCC1-WCC26.
Veillard et al. (2018) "Fast 3D Seismic Interpretation with Unsupervised Deep Learning: Application to a Potash Network in the North Sea", *80th EAGE Conference & Exhibition*, pp. 1-5.
Waldeland et al. (2018) "Convolutional neural networks for automated seismic interpretation", *The Leading Edge*, pp. 529-537.
Wang et al. (2008) "Advances in velocity model-building technology for subsalt imaging", *Geophysics*, vol. 73, pp. VE173-VE181.
Yilmaz (2001) "Seismic data analysis: Processing, inversion, and interpretation of seismic data", Investigations in Geophysics, Society of Exploration Geophysicists, pp. 463-476.
Zamir et al. (2018) "Taskonomy: Disentangling Task Transfer Learning", *Proceedings of the IEEE Conference on Computer Vision an Pattern Recognition*, pp. 3712-3722.
Zhang (2008) "Incorporating Geological Conceptual Models and Interpretations into Reservoir Modeling Using Multiple-Point Geostatistics", *Earth Science Frontiers*, vol. 15, pp. 26-35.
Zhang et al. (2016) "Automated Geophysical Feature Detection with Deep Learning," *GPU Technology Conference*, pp. 1-22.
Zhu et al. (2017) "Toward Multimodal Image-to-lmage Translation", *31st Conference on Neural Information Processing Systems*, pp. 1-12.
Zou et al. (2004) "Statistical validation of image segmentation quality based on a spatial overlap index", *Academy of Radiology*, vol. 11, pp. 178-189.

\* cited by examiner

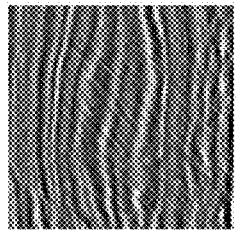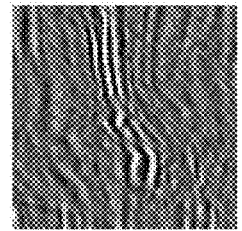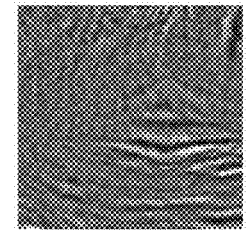
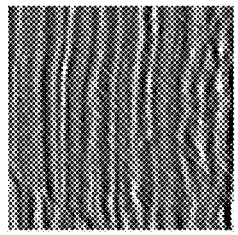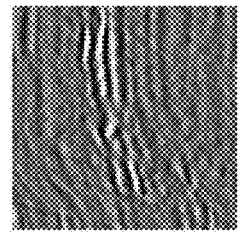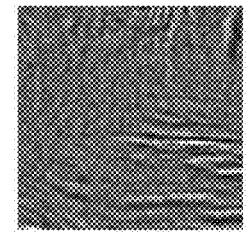
FIG. 6A
FIG. 6B

DATA AUGMENTATION FOR SEISMIC INTERPRETATION SYSTEMS AND METHODS

CROSS-REFERENCE TO RELATED APPLICATIONS

This application claims the benefit of U.S. Provisional Application 62/826,095, filed Mar. 29, 2019, entitled "Data Augmentation for Seismic Interpretation Systems and Methods", and U.S. Provisional Application 62/777,941, filed Dec. 11, 2018, entitled "Automated Seismic Interpretation-Guided Inversion" the entirety of which are incorporated by reference herein.

FIELD

This disclosure relates generally to the field of geophysical prospecting and, more particularly, to seismic prospecting for hydrocarbon management and related data processing. Specifically, exemplary embodiments relate to methods and apparatus for improving computational efficiency by using data augmentation to improve seismic interpretation systems and methods.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface geologic structures. For example, seismic data may be gathered and processed to generate subsurface models that reveal geologic structure. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping (including images of maps, such as 2-D or 3-D images presented on a display) of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, one or more inversion procedures may be utilized to analyze the geophysical data and produce models of rock properties and/or fluid properties. Generally, inversion is a procedure that finds a geophysical parameter model (e.g., a velocity model, in which each unit or cell within the model has associated with it a value indicating velocity with which seismic waves would travel through a portion of the subsurface corresponding to that cell), or a collection of models, which, through simulation of some physical response to those parameters, can reproduce to a chosen degree of fidelity a set of measured data. Inversion may be performed, for example, on seismic data to derive a model of the distribution of elastic-wave velocities within the subsurface of the earth. For example, Full Wavefield Inversion (FWI) simulates seismic waves as induced in the field, and attempts to match the measured seismic response. FWI tends to be a very challenging computational problem because the amount of data to be simulated is large (comprising a full three-dimensional seismic acquisition of a subsurface region), and simulated seismic waves are sensitive to not only a large volume of the earth, but to relatively fine-scale variations in properties within that volume. Therefore, naive parameterization of a subsurface model (e.g., by uniform discretization) may require many volume elements (voxels) of uniform elastic velocities to match simulated data to the observed seismic data.

Seismic interpretation seeks to infer geology (e.g., subsurface structures) from geophysical data, preferably and frequently once that data has been inverted or otherwise transformed into a subsurface model (e.g., the velocity or physical properties models noted above, which as also noted may take the form of an image of the subsurface). For example, structural interpretation generally involves the interpretation of subsurface horizons, geobodies (e.g. salt anomaly), and/or faults from subsurface models (including, e.g., seismic images). Structural interpretation is currently a laborious process that typically takes months of interpreters' time. As such, structural interpretation is one of the key bottlenecks in the interpretation workflow.

Automated seismic interpretation (ASI) in general, and more specifically machine-augmented seismic interpretation (MASI), can potentially relieve such bottlenecks. For example, ASI may utilize a machine learning (ML) system with training data, such as data representing a broad set of geophysical and geological environments. The ML system may generate trained models based on the training data. The ML system may then apply the trained models to generate a seismic interpretation of a test dataset and/or infer geologic features therefrom.

A fundamental assumption of a ML model is that the training data and the test data are from the same statistical distribution. However, many characteristics of seismic training and test datasets may be different due to disparities in seismic acquisition and processing techniques used to produce the images, disparities in noise (e.g. multiples or swell noise), and/or disparities in geological settings. For example, the quality of seismic images can be affected by seismic acquisition factors such as survey types (e.g. ocean-bottom cable, streamer, or nodal acquisition in marine seismic), azimuthal coverage, data frequency spectrum (e.g. broadband data versus narrowband), and/or spatio-temporal sampling rates. The choice of seismic processing methods can also affect the fidelity of geophysical models, creating various inaccuracies in, e.g., velocity models and images. The geological settings can vary considerably from basin to basin (e.g. salt presence leading to enigmatic structures). When the diversity of training data is limited to a single geological basin, a ML model may have difficulty generalizing to another dataset with different geological structures than those portrayed in the training data. Under current systems and methods, given a new application dataset, an interpreter manually selects from a set of variously trained models (e.g., trained with different training data).

In a typical ML-based interpretation task, the ML model is presented with examples of input values (e.g. seismic image, the above-described geophysical models including velocity models or attribute volumes such as images derived therefrom) and corresponding target output values (e.g. labels of geological features such as fault or salt labels). A ML model with unknown model parameters is trained to map the input values to the target output values. The goal of the training is to determine the unknown model parameters from the training examples such that the ML model can accurately predict an output value when new or unseen input values are present. The ability of the ML model to perform well on new or unseen input data is referred to as "model generalization," or simply "generalization." Typically, a significant amount of training data is involved in training a ML model that can generalize well, especially when the ML model is based on neural networks such as deep neural networks. Lack of sufficient amount of training data may lead to ML models that merely memorize input-output relationships available in the training data, but that perform poorly on new test data. This problem is referred to as "overfitting."

One approach to address overfitting problems is to augment training data (e.g., scaling, translation, rotation, and/or resizing images). However standard data augmentation strategies developed for image-processing applications may produce limited plausible alternative samples and/or may lead to geologically or geophysically infeasible or implausible alternative samples, resulting in ineffective trainings and lack of generalization. For example, one way of augmenting a two-dimensional image using a standard data augmentation strategy is to flip the image along an axis. The mirrored image, in theory, is realizable in the real world images, depending on the location and orientation of the cameras. However, for geophysical data augmentation, a new sample may not be geologically realizable (e.g., upside-down seismic volume).

The standard data augmentation methods can also be a bottleneck for efficient training of ML models for learning seismic interpretation, particularly when augmented data is to generated in real time during the training. The standard augmentation routines for three-dimensional images often take more clock time than the training itself.

Current three-dimensional image augmentation approaches are based on the ones developed for two-dimensional images, and typically treat a three-dimensional image as multiple independent two-dimensional slices stacked along a third dimension. The augmentation process extracts two-dimensional slices from a three-dimensional volume and manipulates them using an image transformation technique (e.g. rotation, translation, resampling and/or scaling) as performed in the standard two-dimensional augmentation processes, and stacks them up into a volume. As a result, conventional three-dimensional augmentation can be considered as multiple steps of two-dimensional augmentations repeated for the number of slices. This way of performing augmentation may lead to a great deal of computational complexities and cost.

The choice of data augmentation may be determined by the nature of the ML application and/or type of training data. Standard augmentation strategies may not lead to geophysically- or geologically-meaningful samples. For instance, existing augmentation methods may assume an isotropic data representation, and augment the two-dimensional image data along each of the three axes isotropically. Such augmentation methods may ignore the fact that three-dimensional seismic images from different datasets may be sampled differently along time/depth, and/or in-line and cross-line dimensions (e.g., different frequency context in depth/time versus in-line or cross-line directions). Seismic images also differ from other types of datasets in that features may vary in scale anisotropically. For example, a narrow fault may extend vertically over a great distance. Thus, when scaling-up a sample from a seismic image, application of a single scaling factor in all directions may fail.

ML algorithms for seismic processing and/or interpretation may require extensive computer resources (e.g., large numbers of CPUs, GPUs, and/or parallel processors, large amounts of memory and/or storage spaces). It should be appreciated that three-dimensional seismic image sizes are often two to four orders of magnitude larger than typical natural image sizes, and one to two orders of magnitude larger than medical image sizes. Standard augmentation methods have difficulty scaling-up to such large datasets and/or parallel computing environments.

More efficient equipment and techniques to generate subsurface models would be beneficial.

SUMMARY

One or more embodiments disclosed herein apply to data augmentation systems and methods for training machine learning models to effectively learn subsurface geological features from seismic datasets. One or more embodiments disclosed herein may provide model generalization across seismic training datasets, validation datasets, testing datasets, and/or inference datasets, for example, when training data is scarce for learning seismic interpretation and/or when computational resources (e.g. CPU, GPU, memory and storage) are constrained. One or more embodiments disclosed herein may directly use knowledge from geophysics and/or geology for effective data augmentation or to automate augmentation processes, for example, using domain adaptation techniques and/or a reinforcement learning approach. One or more embodiments disclosed herein may provide automated augmentation approaches that learn to synthesize new data samples from training data. One or more embodiments disclosed herein may provide new data samples that represent interpretation challenges in the testing datasets and/or inference datasets.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

FIG. 5A illustrates an example of fault deformation applied to a checkerboard image, and FIG. 5B illustrates a fault deformation applied to a real seismic image.

FIGS. 6A-6B illustrate nonlinear deformation fields applied to two-dimensional seismic images.

DETAILED DESCRIPTION

Figure 1:
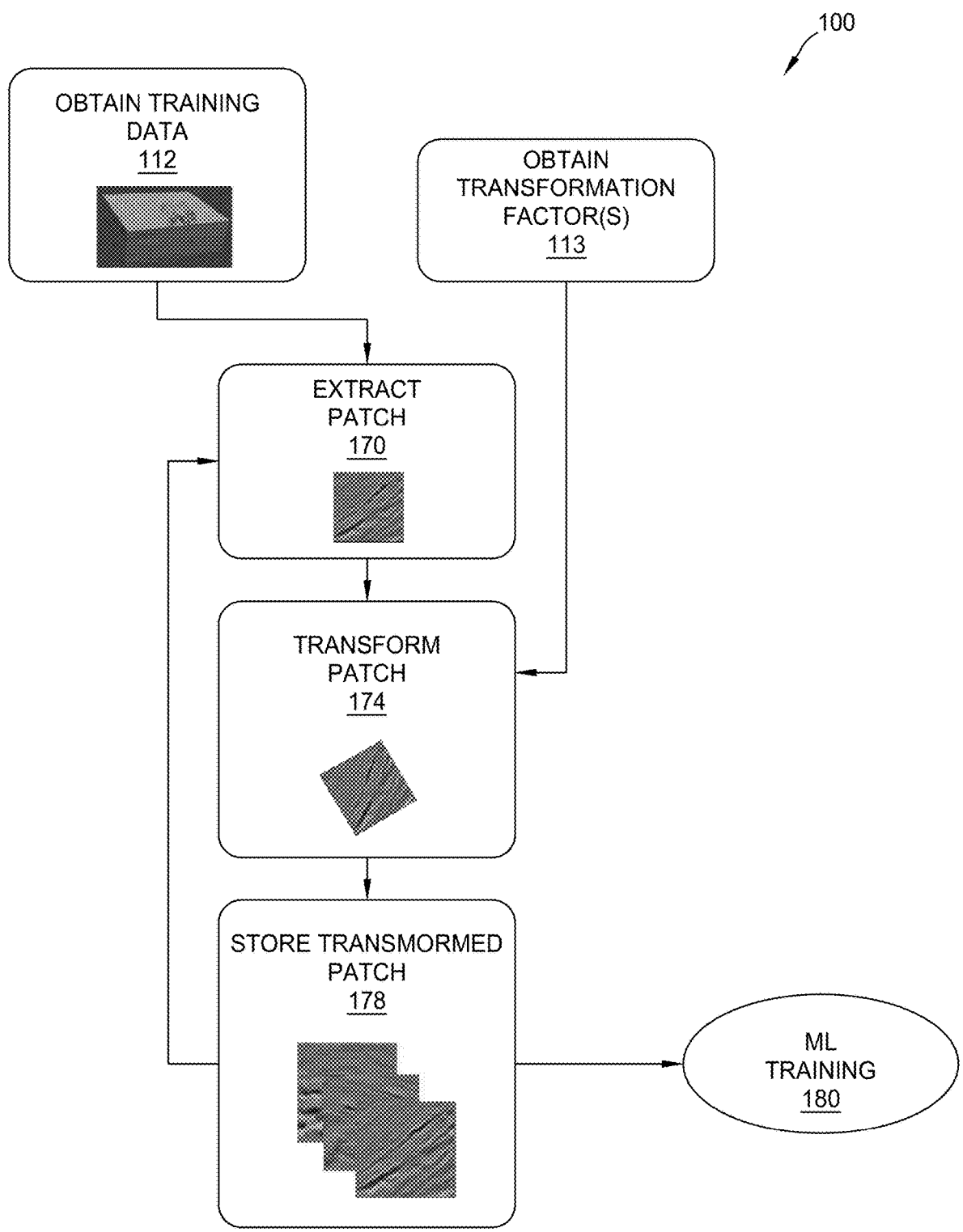
FIG. 1 illustrates an exemplary method of offline augmentation for a machine learning (ML) system.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "scarce" refers to a limited statistical distribution. When used in the context of training datasets, a scarce dataset covers a limited portion of the statistical distribution of the testing/inference datasets. In other words, a scarce training dataset statistically covers a limited portion of plausible scenarios of all interpretation cases.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

As used herein, geophysical model building (e.g. velocity model building), inversion in general, and more specifically Full Wavefield Inversion (FWI), refer to geophysical methods which are used to estimate subsurface properties (such as velocity or density). The fundamental components of inversion can be described as follows: using a starting subsurface physical properties model, synthetic seismic data are generated by solving a wave equation (e.g., acoustic or elastic wave equation) using a numerical scheme (e.g., finite-difference, finite-element, etc.). The synthetic seismic data are compared with the field seismic data, and, using the differences between the two, the value of an objective function is calculated. To minimize the objective function, a modified subsurface model is generated which is used to simulate a new set of synthetic seismic data. This new set of synthetic seismic data is compared with the field data to recalculate the value of the objective function. An objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and to update the subsurface model. Suitable local objective function optimization methods include, but are not limited to, gradient search, conjugate gradients, quasi-Newton, Gauss-Newton, and Newton's method. Suitable global methods included, but are not limited to, Monte Carlo or grid search. Inversion may also refer to joint inversion with multiple types of data used in conjunction.

The terms "velocity model," "density model," "geophysical model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell- or voxel-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, expectations, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, "In-line" refers to a direction parallel to the axis between a source and a receiver. "Cross-line" refers to a direction perpendicular to the axis between a source and a receiver. "Offset" refers to a distance between a source and a receiver. "Midpoint" refers to a location on the axis between a source and a receiver that is approximately half-way between the source and the receiver.

As used herein, a "gather" refers to a display of seismic traces that share an acquisition parameter. For example, a common midpoint gather contains traces having a common midpoint, while a common shot gather contains traces having a common shot.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

The term "patch" generally refers to any set or subset of geophysical data (whether in 1-D, 2-D, 3-D or 4-D) constituting a grouping of one or more cells, pixels, voxels, or other forms of units of divisions (e.g. discretization) of such data. In some instances, the boundaries of a patch may be segmented, frayed, punctured, or otherwise subject to concavities, and/or a patch may comprise contiguous or non-contiguous units. A patch may comprise as small as a single unit of division or as big as the entire dataset.

The term "label" generally refers to identifications and/or assessments of correct or true outputs provided for a given set of inputs. Labels may be of any of a variety of formats, including text labels, data tags (e.g., binary value tags), pixel attribute adjustments (e.g., color highlighting), n-tuple label (e.g., concatenation and/or array of two or more labels), etc.

The term "real time" generally refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that real time approximates instantaneous action. Real time may also refer to longer time delays that are still short enough to allow timely use of the data to monitor, control, adjust, or otherwise impact subsequent detections of such physical events.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

Machine learning (ML) models discussed herein may include one or more neural networks. These networks may be trained with examples in which the labels (e.g. output assessments) are provided for a given set of inputs. In some embodiments, the training includes an optimization process by which the parameters of the network (e.g. weight of the filters used in each network layers) are determined. The optimization may seek to minimize, or at least reduce, an objective function representative of the error between network prediction and label values.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that machine learning (ML) models for Automated Seismic Interpretation (ASI) may be trained to efficiently learn one-, two-, and three-dimensional seismic patterns, segments, and/or geological structures, direct hydrocarbon indicators, reservoir and/or fluid contact delineations. Other potential advantages include one or more of the following, among others that will be apparent to the skilled artisan with the benefit of this disclosure: generation of plausible sets of augmented data for seismic images; a generative model that learns to augment seismic images and/or annotations for training ML models for recognizing geological features from seismic images and/or attribute images (e.g. seismic variance image); better (including more computationally efficient) model generalization across the training, validation, testing, and inference with seismic datasets, for example by enlarging seismic training data, especially in resource-constrained computing environments (CPU, GPU, memory, and/or storage). Unlike conventional data augmentation methods, methods of geophysical data augmentation disclosed herein may provide geologically realizable samples. Such data augmentation strategies for learning seismic interpretation tasks may be determined by considering plausible varieties in seismic acquisition, processing techniques used to produce the images, noise, and/or geological settings. Embodiments of the present disclosure can thereby be useful in hydrocarbon management, including in the prospecting for, discovery of, and/or extraction of hydrocarbons from subsurface formations.

Embodiments disclosed herein propose data augmentation systems and methods designed to achieve a better model generalization across training, validation, testing, and inference with geophysical datasets (e.g., seismic datasets, electromagnetic datasets, gravity datasets, 4-D (time-lapse) seismic images, electromagnetic images, induced polarization images, gravity images, and combinations and/or derivatives thereof). For example augmentation systems and methods may directly use knowledge from geophysics and/or geology for effective data augmentation or to automate augmentation processes using domain adaptation techniques and/or reinforcement learning approaches. In some embodiments, geologically and geophysically feasible alternative samples may be based on features in common in the seismic training and testing datasets. In some embodiments, more abstract features of the datasets may be more likely to be shared across datasets obtained from different geological settings and/or different geophysical acquisition and/or processing methods. In some embodiments, ASI may utilize seismic data augmentation systems and methods to improve training data, ML training efficiency, and/or ML inference accuracy. For example, ASI systems and methods may be used to train ML models to learn and/or infer subsurface features for one or more geologic scenarios from seismic images. Suitable ASI systems and methods are further described hereinbelow, and also are described in co-pending U.S. application Ser. No. 16/059,567 (U.S. Publication No. 2019/0064378), entitled "Automated Seismic Interpretation with Fully Convolutional Neural Networks," which is herein incorporated by reference.

Embodiments disclosed herein include data augmentation systems and methods for ML training. In some embodiments, the data augmentation may be performed prior to the ML training, referred to herein as "offline augmentation." In some embodiments, the data augmentation may be performed during the ML training (e.g., in real time), referred to herein as "online augmentation." In some embodiments, availability of computational resources (e.g., processing units, storage, memory, and/or I/O throughput) may indicate applicability of either offline augmentation or online augmentation.

Offline Augmentation

FIG. 1 illustrates an exemplary method 100 of offline augmentation for a ML system. Method 100 begins with obtaining input information, such as training data (e.g., seismic data representative of a subsurface volume and corresponding labels of geologic features for the subsurface volume), at block 112, and transformation factor(s), at block 113. The actions of blocks 112 and 113 may occur in parallel, sequentially, and/or in any order.

In some embodiments, a seismic survey may be conducted to acquire the initial training data (noting that these and other embodiments may also or instead include obtaining other geophysical data in addition or, or instead of, seismic data—such as obtaining, electromagnetic, electrical resistivity, gravity measurements). In these and other embodiments, simulation models may be utilized to generate synthetic initial training data (e.g., computer simulation). In some embodiments, the initial training data may be obtained from a library of data from previous seismic surveys or previous computer simulations. In some embodiments, obtaining training data includes processing acquired data and/or simulated data (e.g., generating images, identifying and/or labeling features, manually and/or automatically annotating data elements). In some embodiments, a combination of any two or more of these methods may be utilized to generate the initial training data. In some embodiments, the transformation factor(s) may be obtained by selecting from ranges (e.g., preset and/or calculated by comparing training data (obtained at block 112) and expected testing data (e.g., testing data to be used with the ML system following the training)).

Obtaining transformation factors may include, e.g., generating transformation factors (such as angle rotations, frequency selections, scaling factors (factors for stretching or compressing of image or elements of an image), and the like). Transformation factors may be generated randomly, and/or at regular or semi-regular intervals. In alternative embodiments, the transformation factors may be updated automatically as a part of a machine learning process, particularly a reinforcement learning process. For example, the transformation factors may be initialized with a standard value, an estimation, and/or an educated guess, and then the transformation factors may be iteratively updated to determine an optimal set of transformation factors (e.g., as new input training or other data is provided to an ML system with a model comprising such transformation factors, and the ML system's model outputs predictions or other results, the transformation factors of the model are also iteratively updated with such outputting of results). In particular embodiments, the transformation factor(s) may be determined based at least in part upon geologic and/or geophysical domain knowledge. This may include determining ranges for suitable transformation factors (e.g., a range within which a randomly generated transformation factor must fall; or a set of rules for generation of transformation factors). For example, geologic knowledge may indicate that it would be unrealistic to rotate a patch containing a fault feature by greater than 30 degrees (or in some cases by greater than, e.g., any of 33, 35, 37, or 40 degrees; and/or in other cases by greater than 22, 25, or 28 degrees), since fault features are generally steeply dipping. Accordingly, a randomly generated transformation factor that corresponds to an angle rotation may be randomly or semi-randomly generated, but constrained by the parameter that the generated rotation angle must be between 1 and, e.g., 20, 22, 25, 28, 30, 33, 35, 37, or 40 degrees. Similarly, it may also be unrealistic to flip a patch (or other dataset corresponding to a seismic data image or portion of such dataset) along a vertical axis for most, if not all, geologic features of interest. Thus, any transformation factor that is generated and which corresponds to flipping may be constrained by the rule that such generated flipping factor cannot include flipping around the vertical axis (although such flipping factor may otherwise be randomly generated).

As another example, geophysical domain knowledge may indicate that transformations of the spatial gridding of a patch (or other dataset corresponding to a seismic data image, or portion of such dataset) should only result in lateral intervals that are common to datasets that exist in a database. An example of a common range that exists across seismic images spans from 6.25 m to 25 m. Limiting transformation factors to ranges that are reasonable for most data will potentially allow learning schemes to converge at a reasonable rate while also allowing for broad generalization for most unseen data. For example, according to some embodiments, transformation of spatial gridding of a patch may be limited such that the transformation results in lateral intervals of the spatial gridding within an acceptable range determined by reference to geologic and/or geophysical knowledge (e.g., 6.25 m to 25 m, 5 m to 30 m, 7 m to 20 m, with ranges from any one of the foregoing lows to any one of the foregoing highs also contemplated in various embodiments).

As another example, geophysical domain knowledge may include frequency bandwidth transformation factors limited to what is common in most datasets. For many seismic images the bandwidth lies between 4 Hz and 100 Hz (although other ranges may be applicable, such as between 3 Hz and 110 Hz, 2 Hz and 120 Hz, or 5 Hz and 90 Hz, with ranges from any one of the foregoing lows to any one of the foregoing highs also contemplated in various embodiments), although it should be recognized that specific frequency limitations are not required for practice of many embodiments of the present disclosure. More generally, the frequency content of datasets may be assessed by using windowed Fourier transforms to help determine whether to update this range. Transforms may include wavelet-based filtering, which utilize such transformation factors as central frequencies, corner point frequencies, and rates of decay from these corner point frequencies, common frequency filters (Butterworth, Hann, Ormsby, etc.), and shaping filters, which are designed to match an input dataset to another frequency spectrum.

Method 100 continues at block 170 where one or more patches are extracted from the training data. For example, a 3-D patch (e.g., 100 pixels×100 pixels×100 pixels) may be extracted from a volume (e.g., 1000 pixels×1000 pixels× 1000 pixels) represented in the training data (including any geophysical data and geologic feature labels therein). In some embodiments, as part of the patch extraction 170, the 3-D patch may be stored, for example on a disk or in an electronic storage such as a database. In some embodiments, at block 170 the 3-D patch may be retained in temporary memory, for example in temporary memory associated with a processor (e.g., CPU or GPU cache, RAM, or the like). In some embodiments, the patches may be extracted randomly from the data volume. In some embodiments, the patches may be extracted by overlapping a sliding window to cover the entire data volume. In some embodiments the patches may be extracted non-symmetrically and/or non-isometrically throughout the volume. For example, some extraction strategies may address class imbalances. Where a portion of data volume is known or expected to have few meaningful features (e.g., few or no labels), the patches may be extracted sparsely from that portion, and more robustly in other locations. Extraction strategies may address class imbalances due to the nature of the geologic feature(s) of interest. For example, the sparse nature of fault planes in 3-D seismic images may result in such geologic features and their corresponding labels occupying a relative small portion of the volume of any given 3-D seismic image. Regular sampling would potentially result in a large amount of patches that have no corresponding labels of faults, which may negatively impact the training of a deep learning system intended to detect such features. In some embodiments, a sample rejection policy may be imposed, such that the proportion of geologic labels of pixels in any given patch must meet a set criterion, otherwise the patch is disregarded.

Method 100 continues at block 174 where the one or more extracted patches (e.g., both geophysical data and associated labeling) are transformed. Appropriate transformations may include both linear and non-linear operations in a variety of domains (e.g., spatial, temporal, frequency, etc.). For example, a simple transformation may be an identity transformation which returns the input patch. An identity transformation may be desired to include the original character of the data, or if the patch is to be augmented post extraction. Appropriate transformations may be based on one or more transformation factors obtained at block 113. In some embodiments, such transformations may be in accordance with any one or more of the various ASI augmentation strategies described later in this specification. In some embodiments, both geophysical data and geologic feature labels are transformed at block 174.

In some embodiments, patch transformations at block 174 may also or instead include spatial transformation (e.g. the patches may be mirrored, rotated, translated, resampled, scaled, elastically deformed, nonlinearly deformed, manipulated in frequency spectrum, changed pixel intensity, etc.). For example, the 3-D patch may be mirrored along the x- and y-axes (in-line and cross-line directions). As another example, in addition to or in lieu of the mirroring, the 3-D patch may be rotated along the x-, y-, and z-axes separately. The rotation may be different along the z-axis (vertical) than along the x- and y-axes. For example, the 3-D patch may be rotated between about ±20 degrees along the x- and y-axes, and between about 0 degrees and about 360 degrees along the z-axis. In some embodiments, the rotation angles may be selected at regular intervals within the ranges. As another example, in addition to or in lieu of the mirroring and/or rotations, the 3-D patch may be scaled along the x-, y-, and z-axes separately. A scaling factor for each axis may be chosen from a range together or independently, such as between about 0.8 and about 1.2. In some embodiments, the scaling factor(s) may be calculated by comparing training and testing images. Allowing for scaling independently along axes may help to account for variable dips, differing aspect ratios of certain geologic features, such as channel systems, and differing sample rates across seismic volumes.

As another example of patch transformation at block 174, the 3-D patch may be sampled/resampled along the time axes, for example according to a resampling factor and/or with the use of an interpolation operation. As another example, the transformation may include spectral shaping (e.g., according to a frequency-dependent amplitude normalization strategy). Suitable spectral shaping systems and methods are further described hereinbelow, and also are described in co-pending U.S. application Ser. No. 15/941, 474 (U.S. Publication No. 2018/0306940), entitled "Method for Generating Optimized Seismic Target Spectrum," filed Mar. 30, 2018, which is herein incorporated by reference. As another example, in conjunction with rotation and/or scaling, the rotated and/or scaled patch may be resized to match the original size of the 2-D or 3-D patch. For example, if the rotated and/or scaled patch is larger than the original patch, the rotated and/or scaled patch may be cropped to match the size of the original patch. As another example, if the rotated and/or scaled patch is smaller than the original patch, the rotated and/or scaled patch may be padded with zeros to match the size of the original patch. It should be appreciated that padding with zeros will have no effect on the later ML training, because the objective function value for the zero-padded area is zero. As another example, augmentation of patches spatial gridding may be achieved by interpolation and decimation. As another example, patch transformation may include amplitude scaling. The amplitude distribution across seismic volumes may be different due to differing processing flows and/or the impedance structure of the portion of the subsurface that is imaged. Due to this property, a simple amplitude scaling, such as zero mean and unit variance scaling, which is common in deep learning pre-processing, is insufficient. To help deep neural networks generalize, different scaling strategies may be applied to the patches. Some example amplitude scaling strategies may include: contrast stretching and squeezing up to some quantile of the original distribution of the patch, histogram equalization, adaptive histogram equalization, automatic gain control, etc.

In some embodiments, as part of the patch transformation at block 174, the transformed patch(es) may be stored, for example on a disk or in an electronic storage such as a database. In some embodiments, at block 174 the transformed patch(es) may be retained in temporary memory, for example in temporary memory associated with a processor (e.g., CPU or GPU cache, RAM, or the like).

Method 100 continues at block 178 where the transformed patch(es) is/are stored as augmented data for later use in ML training. For example, the transformed patch(es) may be stored as augmented data in standard format on a disk or in an electronic storage such as a database. In some embodiments, method 100 continues by iteratively extracting patches (at block 170), transforming patches (at block 174), and storing transformed patches as augmented data (at block 178). In some embodiments, at block 178 the augmented data is stored in a data structure that promotes efficient and/or selective access to the various transformed patches during the later ML training.

Once sufficient numbers of patches have been extracted, transformed, and stored as augmented data, method 100 completes and transfers control to a later ML training routine at block 180. In some embodiments, patch sufficiency may be based on the available data storage space. In some embodiments, patch sufficiency may be based on the aforementioned extraction strategy. It should be appreciated that, due to the large number of possible image transformation parameter combinations, the augmented data under method 100 occupies much larger computer storage space than does the original training data. Offline data augmentation method 100 may allow for quicker training, since augmentation occurs prior to, rather than during, training. However, the efficiency of method 100 may be affected by storage system I/O throughput.

In some embodiments, a distributed computing system may be utilized to improve the efficiency of offline augmentation of method 100. For example, the tasks of extracting the patch(es) at block 170 and/or of storing the patches at block 174 may be improved (e.g., higher throughput) with parallel input/output (IO).

Online Augmentation—Post-Patch Extraction

Figure 2:
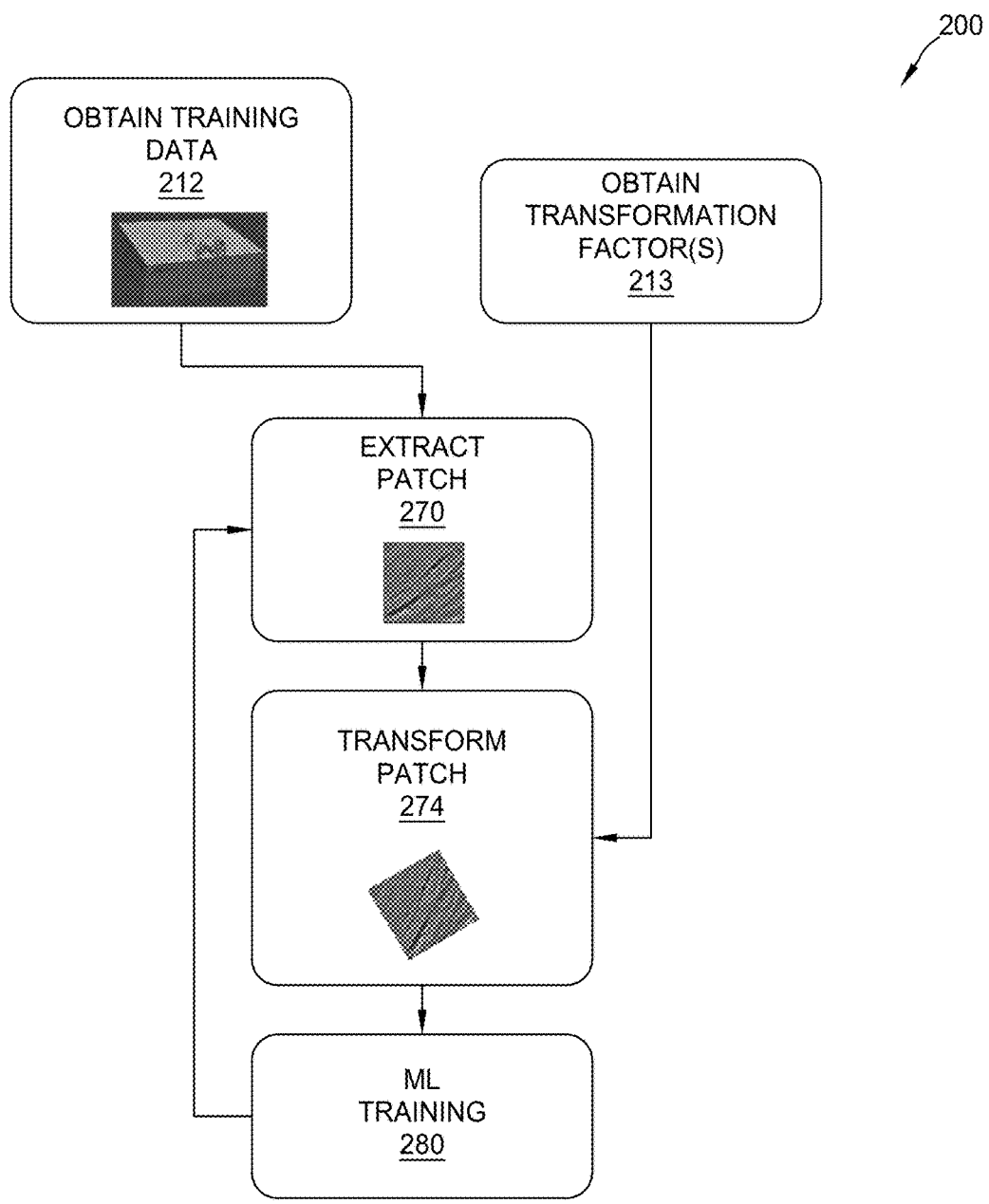
FIG. 2 illustrates an exemplary method of online augmentation for a ML system, where data augmentation occurs after patch extraction.

FIG. 2 illustrates an exemplary method 200 of online augmentation for a ML system, where data augmentation occurs after patch extraction (hence, referred to as "post-patch extraction"). Method 200 begins, similar to method 100, with obtaining input information, such as training data, at block 212, and transformation factor(s), at block 213. As with method 100, the actions of blocks 212 and 213 may occur in parallel, sequentially, and/or in any order.

As with method 100, method 200 continues at block 270 where one or more patches are extracted from the training data.

As with method 100, method 200 continues at block 274 where the one or more extracted patches are transformed.

Unlike method 100, method 200 continues at block 280 where the transformed patch(es) are provided (as augmented data) to a ML training routine. In some embodiments, method 200 continues by iteratively extracting patches (at block 270), transforming the extracted patches (at block 274), and providing the transformed patches as augmented data for the ML training (at block 280).

Method 200 does not permanently store augmented data to a disk or a storage structure. Instead, it generates new patches from existing patches (e.g., extracted patches and/or extracted and transformed patches) during ML training. It should be appreciated that method 200 is typically CPU intensive (more so than method 100) due to the image transformation computations. However, the training efficiency of method 200 is not affected by storage system IO throughput, because the augmented data resides in processor memory. Since online augmentation under method 200 may yield many (theoretically an infinite number) of training samples by extracting patch(es) from randomly selected locations of the data, it is unlikely that the ML training at block 280 will suffer from overfitting.

In some embodiments, a distributed computing system may be utilized to improve the efficiency of post-patch-extraction online augmentation of method 200. For example, the tasks of transforming the patch(es) at block 274 may be distributed in parallel using a cluster of CPUs. In a cluster of nodes with both GPU and CPU processors, a main node with GPU may be deemed to be the master node. As such, the master node may be used for the ML training tasks of block 280. Further, multiple nodes from the cluster of nodes may be deemed to be work nodes, dedicated to the patch transformation tasks of block 274. During ML training, the master node may load the original seismic volume image and labels into its main memory (at block 212). The master node may randomly extract some 3-D patches (at block 270). The master node may put the patches into a queue system. Each of the patches in the queue may be dispatched to one of the worker nodes to perform transformation (at block 274). In some embodiments, a load-balancing mechanism may decide which worker node is assigned which patch(es). Once a worker node receives the assigned patches, it runs the transformation routine, and returns the augmented data to the queuing system of the master node. The master node may then use the augmented data for ML training. In some embodiments, method 200 may be designed in a distributed, asynchronous workflow, so the ML training process on the master node does not wait for each transformation from the worker nodes in order to use the training data.

Online Augmentation—Pre-Patch Extraction

Figure 3:
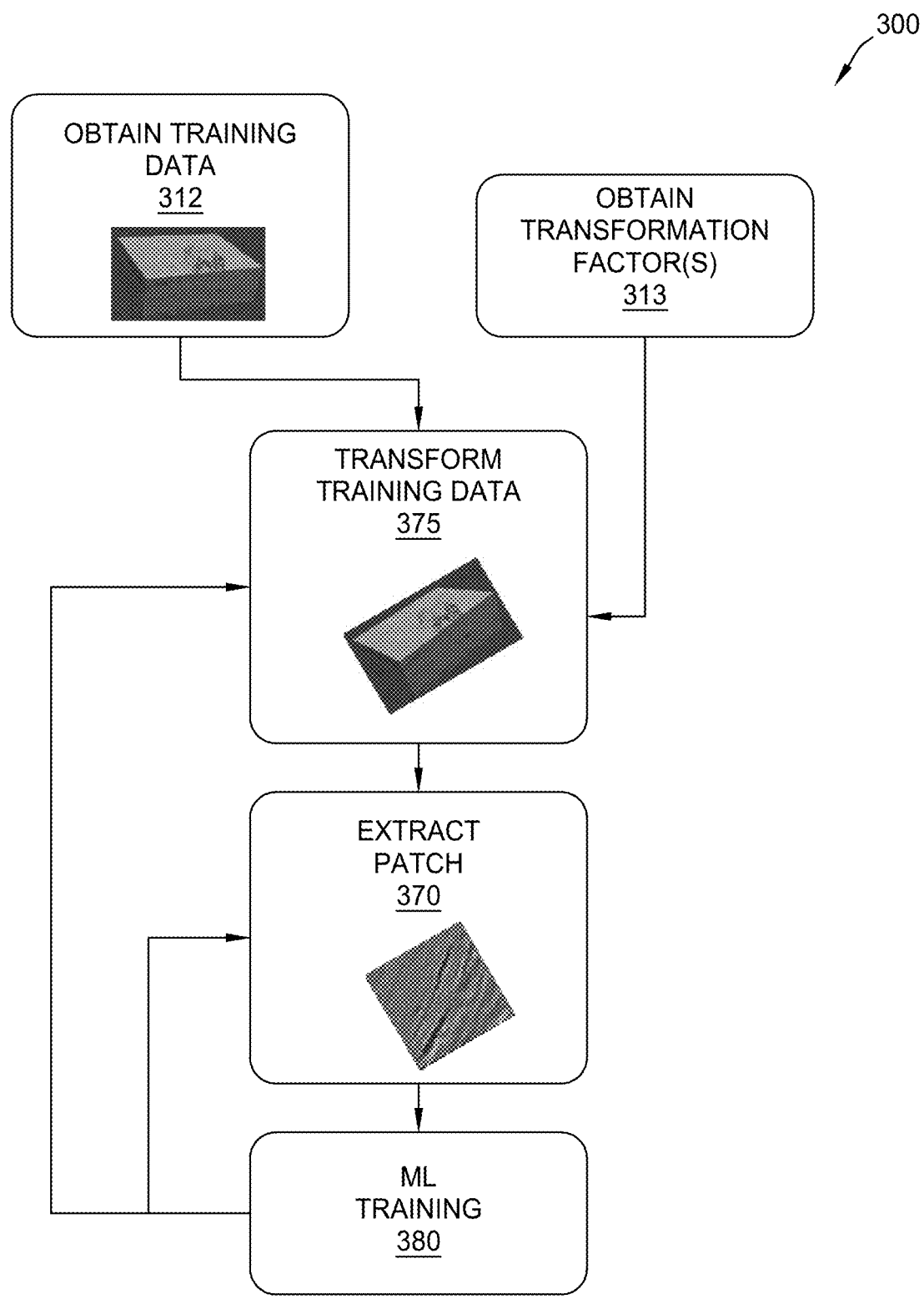
FIG. 3 illustrates an exemplary method of online augmentation for a ML system, where data augmentation occurs before patch extraction.

FIG. 3 illustrates an exemplary method 300 of online augmentation for a ML system, where data augmentation occurs before patch extraction (hence, referred to as "pre-patch extraction"). Method 300 begins, similar to methods 100, 200, with obtaining input information, such as training data, at block 312, and transformation factor(s), at block 313. As with methods 100, 200, the actions of blocks 312 and 313 may occur in parallel, sequentially, and/or in any order.

Unlike methods 100, 200, method 300 continues at block 375 where the training data is transformed prior to patch extraction. For example, the training data may be seismic data and geologic feature labels representative of a subsurface volume. At block 375, the entirety (or a large portion) of the training data may be transformed. In some embodiments, a transformation operation (e.g., matrix operation, kernel operation) may be defined to include multiple transformations. For example, a transformation matrix may be defined to include multiple geometric transformations, such as mirroring, rotation, translation, resampling, scaling, elastic deformation, nonlinear deformation, frequency spectrum manipulation, pixel intensity change, etc. The transformation operation may be applied to the training data to generate augmented data. The transformations (e.g., geometric transformations) may be randomly generated (e.g., random generation of rotation angles and/or scaling factors along one, two, and/or three axes of the image). Transformations may be in accordance with the transformations discussed in connection with block 174 above (and likewise, generation of transformation factors may be in accordance with discussion of block 113 above).

Unlike methods 100, 200, method 300 continues at block 370 where one or more patches are extracted from the augmented data (rather than from the training data). For example, a 3-D patch may be randomly extracted from the volume of seismic data and geologic feature labels.

Similar to method 200, method 300 continues at block 380 where the patches of augmented data are provided to a ML training routine. In some embodiments, method 300 continues by iteratively extracting patches from the augmented data (at block 370), and providing the patches for the ML training (at block 380). In some embodiments, after a certain number of patches are extracted (at block 370), method 300 continues by iteratively defining a new transformation operator (e.g. matrix) to transform the training data (at block 375), extracting patches (at block 370), and providing the patches for the ML training (at block 380). For example, a new transformation matrix may be defined by a set of transformation parameters (e.g., by random sampling within the transformation factor ranges that are consistent with the geological or geophysical knowledge and/or generation of transformation factors, such as random generation of rotation angles and/or scaling factors, and the like). The number of patch samples extracted before iteratively defining a new transformation matrix may depend on the volume size of the training data. Typically, the number of patch extractions is on the order of hundreds to thousands. In some embodiments, the number of patch extractions may be based on the probability (e.g., greater than 90% probability, greater than 95% probability, etc.) of each portion of the original training volume to be extracted as an image patch at least once.

Online data augmentation with pre-patch extraction under method 300 may improve the efficiency of the data augmentation and ML training. For example, method 200 (augmentation post-patch extraction) may be more CPU intensive than method 300 (augmentation pre-patch extraction) due to method 200's multiple separate patch transformations for the multiple resampling steps (patch extractions). Method 300 improves on this by defining a single transformation matrix and only transforming the volume once. For example, rather than six resampling operations for both rotation and scaling in all three dimensions, method 300 may only involve one resampling operation. Moreover, at the ML training stage (at block 380), method 300 does not utilize augmentation steps at each step of patch extraction. Also, by transforming the original seismic input volume, method 300 is efficient for multi-threading environments and optimized implementations. For example, multiple processors may be utilized in parallel for data transformation (at block 375), patch extraction (at block 370), and/or ML training (at block 380). However, it should be understood that method 300 may utilize significantly more CPU memory for resampling the original input volume to convert the format from a native image to the transformation-specific data structure.

Augmentation During Inference

With each of methods 100, 200, 300, ML training (at blocks 180, 280, 380) utilizes augmented training datasets that broaden the original training data by a multiple related to the number of iterations of transformations (e.g. transformations at blocks 174, 274, and 375). Each of these multiple transformations may be similarly applied during inference of test data with the trained ML model. For example, a trained ML model may be used to predict (infer) geological patterns from a test dataset. A ML model that has been trained with augmented datasets may have an objective function (e.g., loss function, binary cross entropy, summation of the loss values coming from each augmented dataset) that is defined to optimize on the multiple augmented training datasets, rather than on the original training dataset. Such a trained ML model may be used to infer geological patterns from multiple augmented test datasets. Use of data augmentation during inference may improve the prediction accuracy of the ML model. For example, if method 300 is used for online augmentation pre-patch extraction of training data to train an ML model (thereby generating a series of transformation matrices), the same transformation matrices may be used to augment the test data during inference with the ML model. Multiple prediction volumes may result from the multiple augmented test datasets. The resulting multiple prediction volumes may be combined (e.g., averaged) to get a probability map of the predicted geological patterns. Depending on the trade-offs between false-positive and false-negative predictions, the resulting multiple prediction volumes may be combined with an optimizing operation, maximizing operation, and/or minimizing operation.

Use of augmentation during inference may allow a ML system that is trained on data of a first type (e.g., from a first type of seismic survey) to be used for inference with test data of a different type (e.g., from a second type of seismic survey, different from the first type). The augmentation methods may allow the ML system to better adapt to the new test data. Note that the resulting multiple predictions may be applied in a similar fashion to applications of multiple predictions from one or more human interpreters. In some embodiments, augmentation methods may make a seismic feature to be identified more apparent (e.g. seismic signatures for fault detection can be easier to identify from a direction normal to the fault plane). In some embodiments, the test data may be transformed similar to the transformation of the training data (e.g. transformations at blocks 174, 274, 375), then the trained ML model may be applied to generate a prediction image, and then an inverse of the transformations may take the prediction image back to the original image space.

Automated Augmentation

Figure 4:
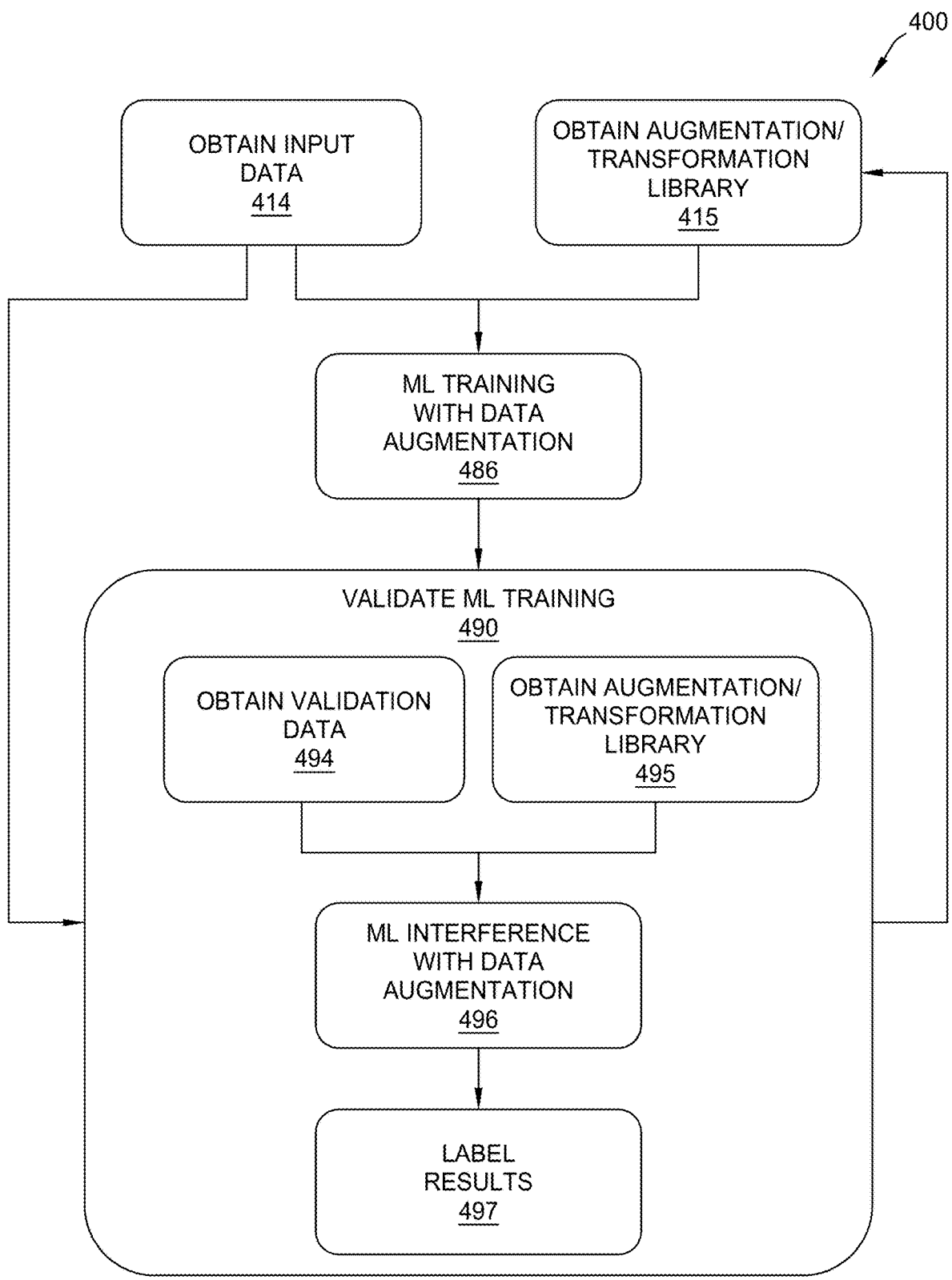
FIG. 4 illustrates an exemplary method of training a ML system to learn augmentation methods and transformations.

The above discussion assumes that the augmentation methods (e.g., methods 100, 200, 300) and/or the various transformations (e.g. transformations at blocks 174, 274, and 375) are manually selected (e.g., preset in the ML system or user input to the ML system). In some embodiments, the ML system may further learn to select augmentation methods and/or transformations to be utilized with training and/or test datasets. For example, the ML system may utilize a reinforcement learning approach to learn augmentation methods and/or transformations that are geologically plausible (e.g., faults features may rotate a maximum of 50 degrees). FIG. 4 illustrates an exemplary method 400 of training a ML system to learn augmentation methods and transformations. Method 400 begins with obtaining input information. For example, input data (e.g., seismic data representative of a subsurface volume and corresponding labels of geologic features for the subsurface volume) may be obtained at block 414. As another example, a library of augmentation methods (e.g., methods 100, 200, 300) and/or geologically plausible transformations (e.g. transformations at blocks 174, 274, and 375) may be obtained at block 415. The actions of blocks 414 and 415 may occur in parallel, sequentially, and/or in any order. In some embodiments, a seismic survey may be conducted to acquire the input data (noting that these and other embodiments may also or instead include obtaining other geophysical data in addition to, or instead of, seismic data—such as obtaining electrical resistivity measurements). In these and other embodiments, models may be utilized to generate synthetic initial training data (e.g., computer simulation). In some embodiments, the initial training data may be obtained from a library of data from previous seismic surveys or previous computer simulations. In some embodiments, a combination of any two or more of these methods may be utilized to generate the initial training data.

Method 400 continues at block 486 where the ML system is trained according to one or more methods of data augmentation (e.g., methods 100, 200, 300). For example, as a part of the ML training at block 486, training data (e.g. training data at blocks 112, 212, and 312) may be obtained from the input data (from block 414). In some embodiments, the training data may be a randomized selection from the input data in order to avoid sampling bias in a statistical point of view. As part of the ML training at block 486, a set of transformations (e.g. transformations at blocks 174, 274, and 375) may be selected from the library of augmentation methods/plausible transformations (at block 415). The selected transformations may be used according to the one or more methods of data augmentation to train the ML system. The ML training at block 486 results in one or more trained ML models.

Method 400 continues at block 490 where the training of the one or more trained ML models (from block 486) is validated. For example, as part of the validation at block 490, validation data may be obtained at block 494. The validation data may be a subset of the input data (from block 414). Note that the validation data may be obtained before, after, or simultaneously with obtaining the training data. Also, note that the training data and the validation data preferably are substantially independent data sets. For example, in some embodiments no more than 50% of the validation data should be common to the training data. The efficiency of method 400 may improve when the validation data set is fully independent of the training data set.

As part of the validation at block 490, the one or more augmentation methods and selected set of transformations of block 486 may be obtained at block 495.

As part of the validation at block 490, the selected transformations may be used according to the one or more methods of data augmentation to make inferences with ML system about the validation data (as discussed above). The ML inferences at block 496 results in multiple prediction volumes and/or a probability map.

As part of the validation at block 490, the quality of the ML inference as represented by the resulting multiple prediction volumes and/or probability map may be assessed at block 497. For example, one or more interpreters may review the prediction volumes and/or probability map to label, rank, grade, categorize, or otherwise identify the quality of the ML inference (at block 496). The assessment may then be utilized as feedback to update the augmentation/transformation library. For example, the augmentation/transformation library may include one or more policies about appropriate selection and/or application of various augmentation methods and/or transformations. Method 400 may iteratively train the ML system (at block 486) and validate the ML training (at block 490) until the results are deemed satisfactory. Method 400 may thereby learn a policy for augmentation/transformation library that may be used to automatically identify augmentation methods and/or transformations for training other ML systems with the input dataset, and/or for training the ML system with other input datasets.

In some embodiments, a reinforcement learning approach may be adopted to learn to select data augmentation strategy and/or to determine optimal transformation factors. For example, a reinforcement learning agent may receive the state of the ML training as well as a reward that indicates how well the ML training progresses. The state may include the input data, augmented data, testing results (inferences or predictions), etc. The reward may be based on the progress (the amount of decrease) associated with the training error and/or validation error. The reinforcement learning agent learns a policy of selecting a data augmentation method and its factors so that the ML training is optimized in terms of minimizing validation error and/or training error. In an embodiment, a machine learning method for use with automated seismic interpretation includes: obtaining training data; extracting patches from a pre-extraction dataset based on the training data; transforming data of a pre-transformation dataset based on the training data and at least one of geologic domain knowledge and geophysical domain knowledge; generating augmented data from the extracted patches and the transformed data; training a machine learning system with the augmented data; prior to training the machine learning system, generating a series of transformation operations; and subsequent to training the machine learning system, using the machine learning system with the series of transformation operations and validation data to generate multiple prediction volumes. In an embodiment, the machine learning method for use with automated seismic interpretation also includes: learning a policy for determining optimal transformation factors by: obtaining the series of transformation operations from a library; training the machine learning system using the training data; testing the trained machine learning system with the validation data; obtaining a state of the trained machine learning system comprising training and testing results; and obtaining a reward that measures performance of the training and testing results.

ASI-Specific Augmentation

The choice of data augmentation method may be determined by the nature of the ML application and type of the training data. Heretofore, standard augmentation strategies may not have led to geophysically or geologically meaningful augmented patches for seismic ML applications. For the purposes of ASI, data augmentation methods may incorporate geology and geophysics knowledge to produce meaningful results.

One type of data augmentation that incorporates geology and geophysics knowledge is frequency/wavenumber augmentation. For example, seismic images may represent time series migrations from acquisition coordinates to subsurface coordinates. In such seismic images, the depth axis may be represented with an equivalent travel time axis. The resolution of such seismic images may be determined by the frequency/wavenumber contents. Depending on seismic survey, the geological characteristics of subsurface, and/or the utilized data processing techniques, the resolution of the seismic images may significantly vary from one image to another. The resolution within an image can also vary with depth due to the inherent increase of wave speed velocities with depth. If such resolution differences exist between the training images and the testing images, the ML model may have difficulty and/or be unable to generalize to test data.

The frequency/wavenumber content of the training data may be augmented to mitigate the resolution disparity across the training and testing datasets. For example, the frequency/wavenumber content of the training data may be augmented to cover plausible frequency ranges across the datasets. One way to achieve frequency/wavenumber augmentation is to apply high pass, low pass, and/or band-pass filters on the training volumes. To promote the generalization of the ML models to a broad range of resolutions, multiple filters may be applied to the same dataset separately to obtain multiple frequency/wavenumber-augmented datasets. Note that augmenting the frequency/wavenumber content of the seismic images does not augment the corresponding labels in the seismic volume.

Another type of data augmentation that incorporates geology and geophysics knowledge is based on manipulations of velocity models to generate new seismic images and geological structures. The seismic images are constructed by migrating shot gathers using inverted geophysical models (e.g. velocity model). It should be appreciated that inaccuracies in the inversion may lead to generation of distorted images and geological features. A set of plausible images may be generated by manipulating the geophysical models and/or patches from geophysical models. For example, an inverted velocity model may be smoothed to facilitate the generation of new seismic images. Such augmentation methods may be particularly useful when ASI is incorporated into inversion and/or velocity model building.

Another type of data augmentation that incorporates geology and geophysics knowledge is augmentation by domain adaptation. For example, differences in survey design, data processing techniques, and/or geological characteristics of the subsurface may lead to differences in statistical distributions (e.g., domain shift in computer vision) of the training images and the testing seismic. Since standard ML techniques assume that the training data and the testing data are from the same distribution, domain shift may present difficulties for generalization by a ML model. Augmentation by domain adaptation may mitigate domain shift problems. For example, augmentation by domain adaptation may transform new test data to the domain of the training data, so that the trained model may perform well on the transformed testing data. Augmentation by domain adaptation can be achieved in an automated fashion by using a neural network trained to learn such domain transforms.

In some embodiments, augmentation by domain adaptation uses two ML systems (e.g., neural networks): one for the ML task of segmentation and/or classification for a seismic pattern recognition problem, and the other for learning the domain adaptation transform(s) to map data between domains. Dividing the pattern recognition tasks from the domain adaptation transformation tasks may allow the ML systems to more easily learn in a modular fashion. In some embodiments, the pattern recognition ML model may be trained in a supervised fashion with training geophysical data and labels. In some embodiments, the domain adaptation model may be trained with a cost function defined to minimize the mismatch between distributions of training and testing geophysical data. When a testing dataset is provided in a domain different from the one that is used for training the model, the domain adaption ML model may be first applied to the new data in order to map the testing data to the domain of the trained model. Next, an inference process may be performed with the pattern recognition ML model to produce predictions.

In some embodiments, style transfer methods may be leveraged for domain adaptation. For example, frequency spectrum mapping from source data to target data can be learned using a style transfer method based on deep generative networks. The network designed for style transfer may be trained by incorporating content and style into the loss function. The network attempts to maintain the content of the original data while also honoring the style variant that is being applied to the data.

In some embodiments, domain adaptation may be achieved by using image-to-image translation methods. The image-to-image translation methods may be based on deep generative-adversarial networks (GANs). GANs are generative models that learn mapping from a noise z to an output y, G: z→y, through an adversarial training process. In this training process, two models are trained simultaneously, a generative model G and a discriminative model D that learns to distinguish a training output from an output of G. On the other hand, generator G is trained to produce outputs that cannot be distinguished from reference outputs by discriminator D. Conditional GANs learn a mapping from noise and input x providing conditions to output y, G: (x, z)→y. The conditional GANs are trained with the paired source and target input data. In geophysical or geological augmentation methods, paired training and target data that both may have the same structures may not be available. Learning image-to-image translation from unpaired samples can be accomplished by cycle-consistent GANs. This approach learns two mappings: forward mapping from a source domain to target domain and its inverse mapping from target domain to source domain. The two mappings may be combined to cycle through source to target back to source domains. Another cycle would be from target to source and back to target domains. Through these cycles, a deep generative model learns to translate an image from a source domain to a target domain in the absence of paired examples. The generative models used in the GANs may be based on autoencoders (AE), variational autoencoders (VAE) or U-net architectures which may accept image patches as inputs and output image patches. The discriminator model may be based on a deep classification network architecture which would take an image patch and outputs a scalar measuring performance of the generative models compared to the reference image patches.

Another type of data augmentation that incorporates geology and geophysics knowledge is geology-based image deformation. For example, due to the time and cost associated with seismic acquisition, often there is the lack of training samples covering a broad range of geological and geophysical patterns (e.g., geology and its geophysical expression where large deposits of salts are present in subsurface). Heretofore, standard augmentation methods may treat seismic images similarly to natural images, missing the geological and geophysical context.

Figure 5B:
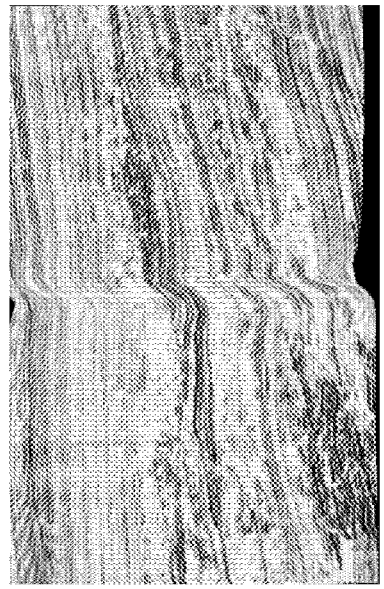
FIGS. 5A-5B illustrate examples of geology-based image deformation for seismic fault augmentation.
Figure 5A:
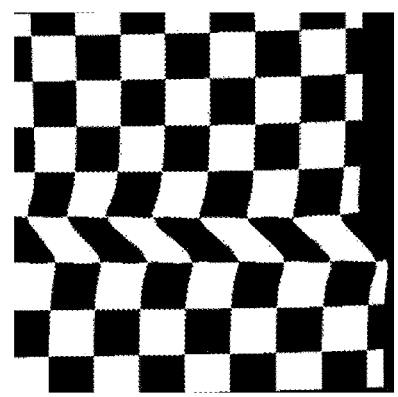

In some embodiments, geology-based image deformation may use an "augmentation by synthesis" approach in order to add more diversified geological patterns (with domain knowledge) to existing training data. For example, FIGS. 5A-5B illustrate an example of geology-based image deformation for seismic fault augmentation. FIG. 5A illustrates a fault deformation applied to a checkerboard image, and FIG. 5B illustrates a fault deformation applied to a real seismic image. In some embodiments, significant portions of seismic training data may have no fault surfaces. The "augmentation by synthesis" method may start by obtaining training data having few or no fault surfaces. The method may then define a deformation field that transforms the seismic images of the training data according to geophysical principals. The seismic images may then be deformed similarly to the way that fault surfaces are generated under actual physical force.

In some embodiments, the deformation field may be defined according to characteristics of the faults on which the ML model will be trained. For example, the deformation field may be a transformation field which locally translates (translational transformation), dilates (dilatational transformation (e.g. image stretching)), and/or shears (deviatoric transformation) the seismic images. For example, a deviatoric transformation shears the image while keeping its volume (or area in 2-D) fixed. The transformation field may be spatially elastic or inelastic. FIG. 6 illustrates nonlinear deformation fields applied on two-dimensional seismic images. The transformation fields are based on translations only. The transformation fields are sampled randomly at every pixel. This approach can generate infinite numbers of new samples. For example, for each of the three input samples of FIG. 6A, two different deformed images are generated, as illustrated in FIG. 6B.

In some embodiments, the geology-based image deformation augmentation method may combine image synthesis with simulation of a geological processes (e.g. faulting/unfaulting, sedimentation). In some embodiments, geology-based image deformation augmentation may explicitly model structured noise. For example, augmented images may have both realistic noise and fault patterns.

Using ML Models Trained by Augmented Training Data

Any of the various above-described augmentation methods preferably result in obtaining a trained ML model. Such a trained ML model may then be used in hydrocarbon management.

For instance, methods according to some embodiments may include: (a) acquiring seismic or other geophysical data from a subsurface region of interest (e.g., through seismic acquisition utilizing seismic "shots" to obtain "gathers" as is known in the art); (b) providing the acquired seismic or other geophysical data to the trained ML model (where the ML model has been trained according to any of the above-described augmented training processes); and (c) using the trained ML model, obtaining a predicted interpretation of one or more geologic features represented by the acquired seismic or other geophysical data. Methods according to some embodiments may further optionally include (d) displaying the predicted interpretation (this may take the form, e.g., of labels generated by the trained ML model being overlaid on a seismic image of the subsurface; or, in other embodiments, a listing of identified features; etc.). Some methods may furthermore include (e) managing hydrocarbons associated with the subsurface using the obtained predicted interpretation and/or displayed predicted interpretation. Managing hydrocarbons may include any of various activities described previously herein, such as (for example, among others) causing a well to be drilled in the subsurface and/or positioning a wellbore in the subsurface based at least in part upon the obtained predicted interpretation and/or displayed predicted interpretation.

In practical applications, the present technological advancement according to many embodiments must be used in conjunction with a seismic data analysis system (e.g., a high-speed computer) programmed in accordance with the disclosures herein. Preferably, in order to efficiently perform data augmentation according to various embodiments herein, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

As will be appreciated from the above discussion, in certain embodiments of the present approach, expert inputs are elicited that will have the most impact on the efficacy of a learning algorithm employed in the analysis, such as a classification or ranking algorithm, and which may involve eliciting a judgment or evaluation of classification or rank (e.g., right or wrong, good or bad) by the reviewer with respect to a presented query. Such inputs may be incorporated in real time in the analysis of seismic data, either in a distributed or non-distributed computing framework. In certain implementations, queries to elicit such input are generated based on a seismic data set undergoing automated evaluation and the queries are sent to a workstation for an expert to review.

Figure 7:
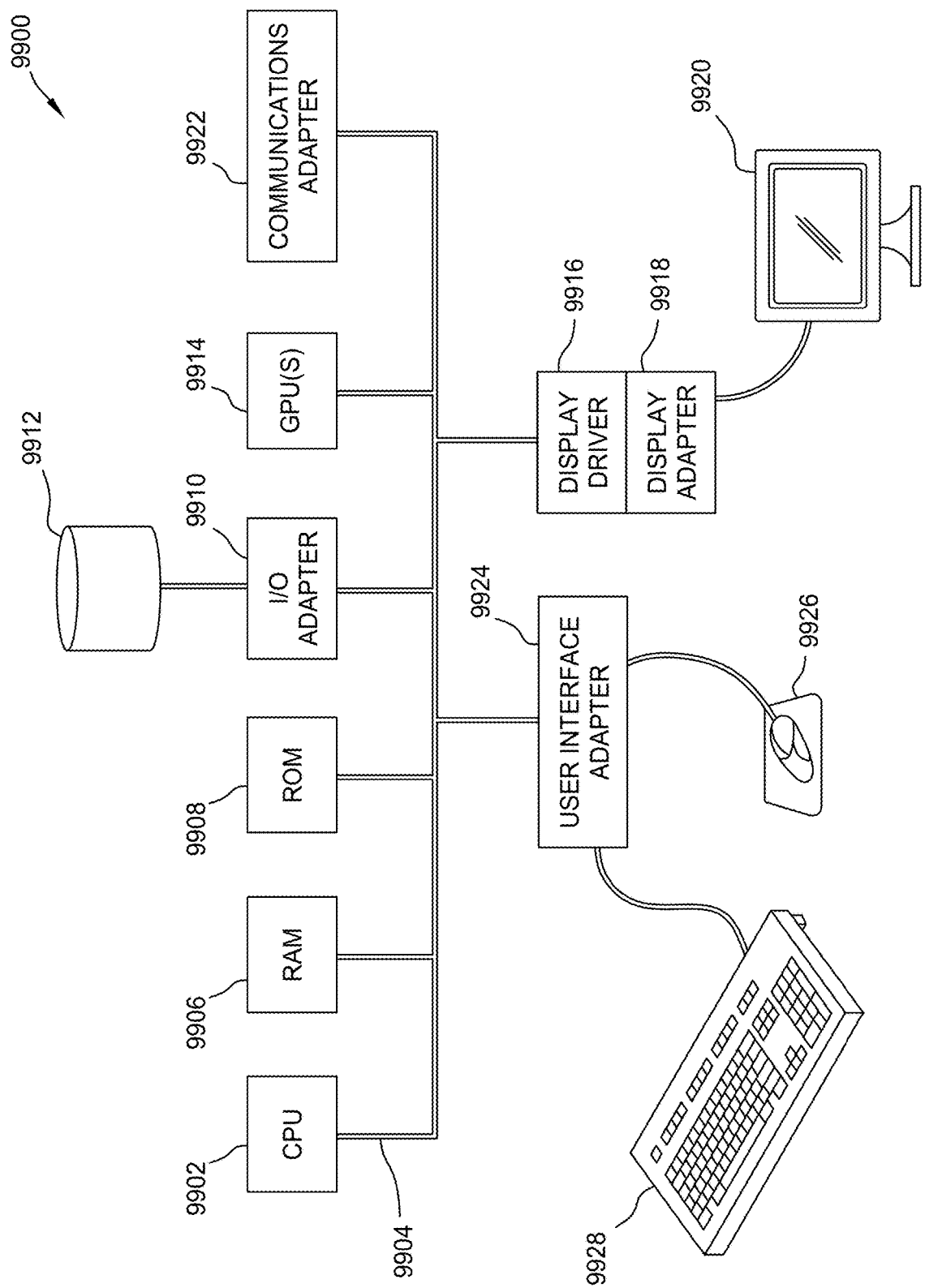
FIG. 7 illustrates a block diagram of a seismic data analysis system upon which the present technological advancement may be embodied.

FIG. 7 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 7, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models and data representations discussed herein (e.g., seismic images, feature probability maps, feature objects, predicted labels of geologic features in seismic data, etc.). As the models themselves are representations of geophysical data, such a display device may also be said more generically to be configured to display graphical representations of a geophysical data set, which geophysical data set may include the models and data representations (including models and representations labeled with features predicted by a trained ML model) discussed herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as deep learning models, neural networks, convolutional neural networks, fully-convolutional U-net architectures, etc. The machine learning architectures may be trained on various training data sets, e.g., as described in connection with various methods herein. The machine learning architectures may be applied to analysis and/or problem solving related to various unanalyzed data sets (e.g., test data such as acquired seismic or other geophysical data, as described herein). It should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon models and data representations (e.g., seismic images, feature probability maps, feature objects, etc.) constructed according to the above-described methods. In particular, such methods may include drilling a well, and/or causing a well to be drilled, based at least in part upon the models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A machine learning method for use with automated seismic interpretation, comprising:
   obtaining input data;
   extracting patches from a pre-extraction dataset based on the input data;
   transforming data of a pre-transformation dataset based on the input data and at least one of geologic domain knowledge and geophysical domain knowledge;
   obtaining transformation factors, wherein the at least one of geologic domain knowledge and geophysical domain knowledge is represented by the transformation factors; and
   generating augmented data from the extracted patches and the transformed data.

2. The method of claim 1, wherein obtaining input data comprises at least one of:
   (a) conducting a geophysical survey of a subsurface region to acquire seismic data, wherein the input data comprises the seismic data; and
   (b) generating images, displaying the images, and labeling geologic features in the images, wherein the input data comprises the labeled images.

3. The method of claim 1, wherein the input data comprises geophysical data and geologic feature labels.

4. The method of claim 3, wherein each patch comprises geophysical data, and at least some of the patches comprise geologic feature labels.

5. The method of claim 1, wherein the input data comprises a data volume and the patches are uniformly distributed throughout the data volume.

6. The method of claim 1, wherein:
   the input data comprises geophysical data and geologic feature labels,
   the input data comprises a data volume,
   at least a portion of the data volume comprises no geologic feature labels, and
   the patches are more sparsely distributed throughout the portion of the data volume than in a remainder of the data volume.

7. The method of claim 1, wherein the transforming the data comprises a spatial transformation, and the transformation factors comprise scaling factors.

8. The method of claim 7, wherein the scaling factors comprise different values in the horizontal plane and the vertical plane.

9. The method of claim 1, further comprising training a machine learning system with the augmented data.

10. The method of claim 9, wherein:
    obtaining input data comprises conducting a geophysical survey of a subsurface region to acquire geophysical data,
    the input data comprises the geophysical data,
    training the machine learning system results in a trained model configured to generate predicted interpretations of the geophysical data, and
    the method further comprises using the predicted interpretations to manage hydrocarbons in the subsurface region.

11. The method of claim 9, wherein training the machine learning system comprises obtaining a trained model or machine comprising executable code that constitutes the trained model.

12. The method of claim 9, further comprising:
    prior to training the machine learning system, generating a series of transformation operations; and
    subsequent to training the machine learning system, using the machine learning system with the series of transformation operations and test data to generate multiple prediction volumes.

13. The method of claim 12, wherein the transforming the data comprises a linear transformation, and the transformation operations comprise matrices.

14. The method of claim 12, wherein:
    the input data comprises training data;
    the test data comprises validation data;
    the training data is substantially independent of the validation data; and
    the method further comprises:

obtaining the series of transformation operations from a library;
assessing the quality of the multiple prediction volumes; and
updating the library with policy updates based on the assessment.

15. The method of claim 14, further comprising iteratively:
obtaining transformation operations and associated policies from the library;
training the machine learning system with the obtained transformation operations and associated policies;
using the machine learning system with the obtained transformation operations, associated policies, and the validation data to generate multiple prediction volumes;
assessing the quality of the generated multiple prediction volumes; and
updating the library based on the assessment.

16. The method of claim 12, wherein:
the input data comprises training data;
the test data comprises validation data; and
the method further comprises learning a policy for determining optimal transformation factors by:
obtaining the series of transformation operations from a library;
training the machine learning system using the training data;
testing the trained machine learning system with the test data;
obtaining a state of the trained machine learning system comprising training and testing results; and
obtaining a reward that measures performance of the training and testing results.

17. The method of claim 1, wherein:
the pre-extraction dataset comprises the input data; and
the pre-transformation dataset comprises the extracted patches.

18. The method of claim 17, further comprising:
storing the transformed data to generate the augmented data; and
training a machine learning system with the stored augmented data.

19. The method of claim 18, further comprising iteratively extracting patches, transforming the extracted patches, and storing the transformed data prior to training the machine learning system.

20. The method of claim 17, wherein at least one of a temporary computer memory and a permanent data storage unit is used for storing the transformed data.

21. The method of claim 17, further comprising iteratively extracting patches, transforming the extracted patches, and training a machine learning system with the transformed-extracted patches.

22. The method of claim 1, wherein:
the pre-transformation dataset comprises the input data; and
the pre-extraction dataset comprises the transformed data.

23. The method of claim 22, further comprising iteratively transforming the input data, extracting patches from the transformed data, and training a machine learning system with the extracted-transformed patches.

24. The method of claim 1, wherein:
the pre-transformation dataset results from a velocity model,
the transforming data comprises manipulating the velocity model, and
the method further comprises performing imaging using the manipulated velocity model.

25. The method of claim 1, wherein:
the pre-transformation dataset comprises images, and
the transforming data comprises elastic or inelastic deformation of the images.

26. The method of claim 1, wherein:
the pre-transformation dataset comprises images, and
the transforming data comprises manipulating frequency or wavenumber content of the images.

27. The method of claim 1, wherein the transforming comprises at least one of:
an identity transformation;
a spatial filter;
a temporal filter;
an amplitude scaling;
a rotational transformation;
a dilatational transformation;
a deviatoric transformation;
a resampling using interpolation or extrapolation;
a spatial and temporal frequency modulation;
a spectral shaping filter;
an elastic transformation;
an inelastic transformation; and
a geophysical model transformation.

* * * * *